US008185278B2

(12) United States Patent
Price et al.

(10) Patent No.: US 8,185,278 B2
(45) Date of Patent: May 22, 2012

(54) METHODS AND SYSTEMS FOR CONTROLLING THE ENGINE SPEED OF AGRICULTURAL VEHICLES

(75) Inventors: Trail Price, Jackson, MN (US); Manu George, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 810 days.

(21) Appl. No.: 12/268,925

(22) Filed: Nov. 11, 2008

(65) Prior Publication Data

US 2010/0121539 A1 May 13, 2010

(51) Int. Cl.
*G06F 19/00* (2011.01)

(52) U.S. Cl. .......... 701/50; 701/103; 701/110; 701/115; 123/396; 123/399

(58) Field of Classification Search ................ 3/50, 102, 3/103, 110, 115, 207; 123/350, 352, 357, 123/361, 376, 396, 399, 403; 701/50, 102, 701/103, 110, 115, 207; 56/10.2 A, 10.2 G; 180/170
See application file for complete search history.

(56) References Cited

U.S. PATENT DOCUMENTS 3,305,042 A * 2/1967 Thorner ........................ 180/171
3,322,226 A 5/1967 Marshall et al.
3,993,175 A 11/1976 Beveridge
5,553,453 A 9/1996 Coutant et al.
7,478,693 B1 * 1/2009 Curtis .......................... 180/165

FOREIGN PATENT DOCUMENTS

GB 2267685 12/1993

OTHER PUBLICATIONS

International Search Report and Written Opinion from PCT Serial No. PCT/IB2009/007278 (dated Mar. 16, 2010).

* cited by examiner

*Primary Examiner* — Alicia Torres

(57) ABSTRACT

An engine speed control system for an agricultural vehicle includes a variable throttle controller, a mode selector, and a control device. The variable throttle control permits an operator to select a variably adjustable engine speed and the mode selector permits the operator to select between a plurality of pre-set engine speeds. The control device receives output signals from the throttle controller, generates engine speed commands, and delivers the commands to an engine controller for controlling the speed of the agricultural vehicle's engine. The control device is operable to generate a first engine speed command associated with one of the pre-set engine speeds when an operator activates the mode selector and to temporarily or permanently override the first engine speed command with a second engine speed command associated with the throttle controller when the operator activates the throttle controller.

6 Claims, 4 Drawing Sheets

METHODS AND SYSTEMS FOR CONTROLLING THE ENGINE SPEED OF AGRICULTURAL VEHICLES

BACKGROUND

1. Field

Embodiments of the present invention relate to agricultural vehicles. More particularly, embodiments of the invention relate to methods and systems for controlling the engine speed of agricultural vehicles.

2. Related Art

Tractors and other agricultural vehicles are often equipped with speed control systems to assist operators in accelerating to and maintaining desired vehicle speeds and to maintain desired power take-off (PTO) shaft speeds. Most known speed control systems receive commands from a hand throttle, foot pedal, or other variable input device that permits an operator to manually select a desired engine speed. Many speed control systems also receive commands from a mode selector that permits the operator to select one or more pre-set engine speeds (e.g. 1,000 RPMs, 1,500 RPMs, etc.).

For safety reasons, speed control systems are typically programmed to cancel or override any pre-set engine speeds from a mode selector whenever an operator moves the variable input device. Unfortunately, this often leads to erratic and unwanted engine speed changes. For example, an operator may operate the mode control switch to select a constant engine speed of 1,000 RPM and then attempt to increase the engine speed by turning up the hand throttle or other variable input device. However, if the variable input device is currently positioned so that it calls for an engine speed lower than the pre-set engine speed, actuating it causes the engine speed to initially drop, not increase. Similarly, the operator may attempt to decrease the engine speed from a pre-set speed by turning down the variable input device, but if the variable input device is currently positioned so that it calls for a higher speed, activating it causes the engine speed to initially increase. Thus, an operator often must "hunt" for a desired engine speed by frequently moving the variable input device up and down.

Accordingly there is a need for an improved system and method for controlling the engine speed of an agricultural vehicle.

SUMMARY

Embodiments of the present invention solve the above-described problems and/or other problems by providing improved methods and systems for more precisely controlling the engine speed of an agricultural vehicle.

One embodiment of the invention is an engine speed control system for an agricultural vehicle comprising a variable throttle controller, a mode selector, and a control device. The variable throttle control permits an operator to select a variably adjustable engine speed. The mode selector permits the operator to select between a plurality of pre-set engine speeds. The control device receives output signals from the variable throttle controller and mode selector, generates corresponding engine speed commands, and delivers the commands to an engine controller for controlling the speed of the agricultural vehicle's engine. In one example, the control device generates a first engine speed command associated with one of the pre-set engine speeds when an operator activates the mode selector and overrides the first engine speed command with a second engine speed command associated with the variable throttle controller when the operator activates the variable throttle controller, the variable throttle controller is moving down, and the variable throttle controller calls for an engine speed less than the pre-set engine speed. The control device may revert to the pre-set engine speed, without requiring the operator to activate the mode selector again, if the operator moves the variable throttle controller up and the variable throttle controller calls for an engine speed greater than the pre-set engine speed.

In another embodiment of the invention, the control device is operable to generate a first engine speed command associated with one of the pre-set engine speeds when an operator activates the mode selector and to cancel the first engine speed command and generate a second engine speed command associated with the throttle controller when the operator activates the throttle controller, the throttle controller is being moved to a higher engine speed, and the throttle controller calls for an engine speed greater than the pre-set engine speed.

These and other important aspects of the present invention are described more fully in the detailed description below. The invention is not limited to the particular methods and systems described herein. Other embodiments may be used and/or changes to the described embodiments may be made without departing from the scope of the claims that follow the detailed description.

BRIEF DESCRIPTION OF THE DRAWINGS

Embodiments of the present invention are described in detail below with reference to the attached drawing figures, wherein.

Figure 1:
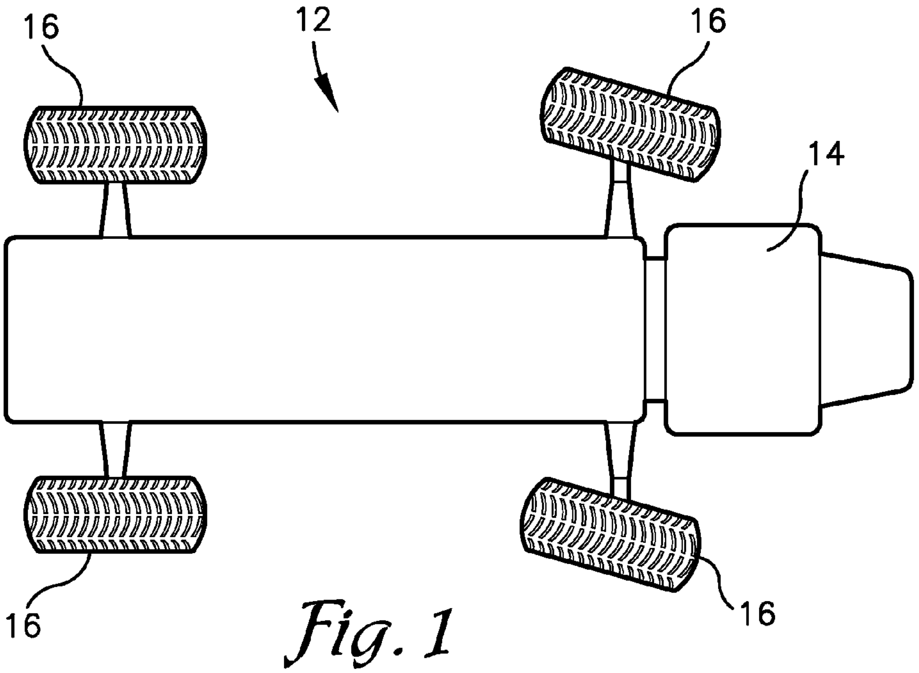
FIG. 1 is a schematic plan view of an agricultural vehicle in which the engine speed control system of the present invention may be used.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawing figures that illustrate specific embodiments in which the present invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense.

Embodiments of the present invention provide a vehicle speed control system 10 that may be mounted in or on a vehicle 12. The vehicle 12 may be an agricultural vehicle, automobile, all-terrain vehicle, or any other type of land-based vehicle. In a particular embodiment, the vehicle 12 is a tractor, combine, windrower, applicator, truck or any other self-propelled vehicle primarily used for farming or other agricultural purposes. As illustrated in FIG. 1, the vehicle 12 includes a cab 14, an engine (not shown), and a plurality of wheels 16, with at least one wheel being operable to turn, pivot, and/or rotate to steer the vehicle 12. Alternatively, the vehicle 12 may include steerable belts and tracks rather than wheels.

Figure 2:
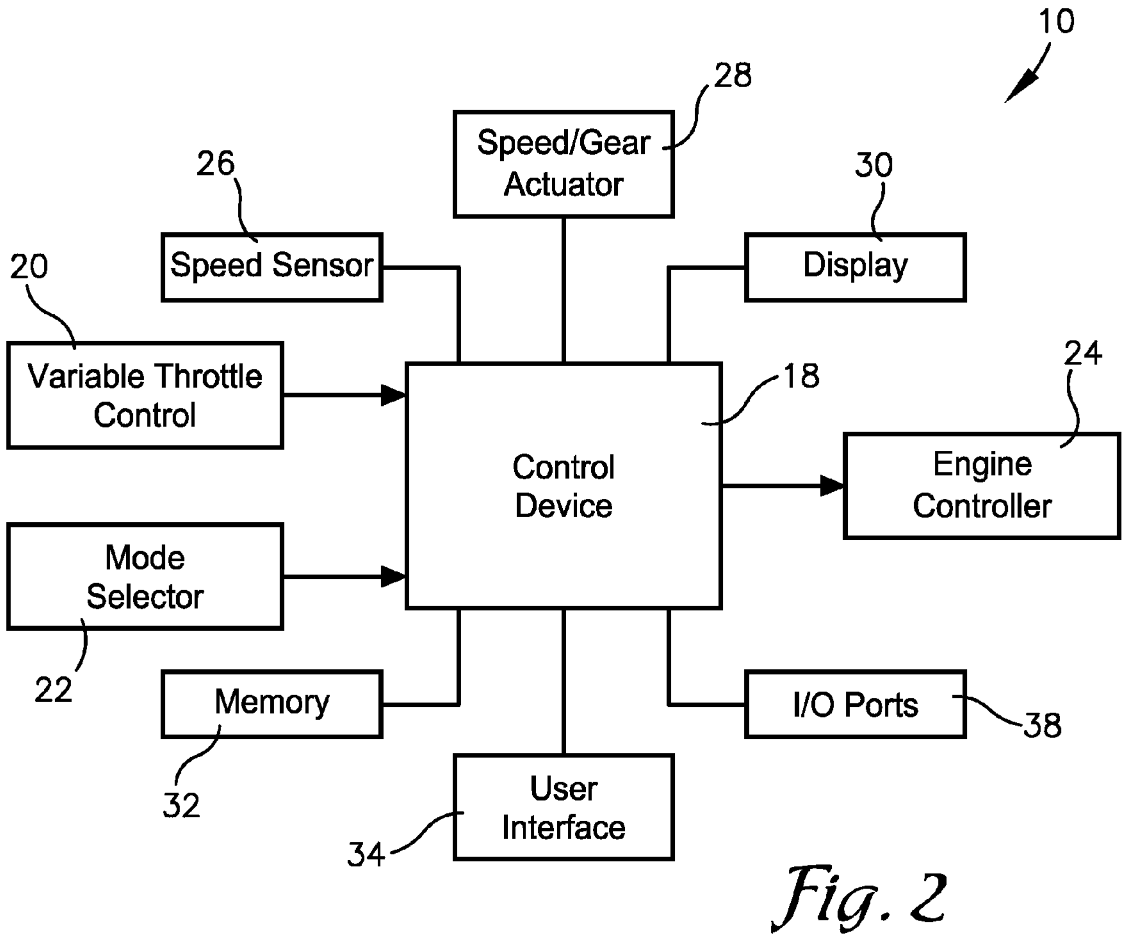
FIG. 2 is a block diagram illustrating certain components of an embodiment of the engine speed control system.

The speed control system 10 can be implemented in hardware, software, firmware, or a combination thereof. An exemplary embodiment of the speed control system 10 is illustrated in FIG. 2 and may comprise at least one control device 18, a variable throttle control 20 and a mode selector 22. As explained in more detail below, the control device 18 monitors the variable throttle controller 20 and mode selector 22, generates engine speed commands at least partially based on signals from the variable throttle control and/or the mode selector, and delivers the engine speed commands to an engine controller 24 for controlling an engine speed of the agricultural vehicle 12.

The control device 18 may include any number of processors, controllers, integrated circuits, programmable logic devices, or other control devices and resident or external memory for storing data and other information accessed and/or generated by the speed control system 10. The control device 18 may be directly or indirectly coupled with the other components of the speed control system through wired or wireless connections to enable information to be exchanged between the various components.

The control device 18 may implement a computer program and/or code segments to perform the functions described herein. The computer program may comprise an ordered listing of executable instructions for implementing logical functions in the control device 18 such as the steps illustrated in FIGS. 3-5 and described below. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, device or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

In some embodiments, the control device 18 may be comprise a control module programmed with control algorithms and operable to receive real-time signals from the variable throttle control 20 and the mode selector 22. The control module may process this data in order to produce a plurality of output commands, such as desired engine speed commands for delivery to the engine controller 24. The control device 18 may be a stand-alone component or may be integrated into other control devices of the agricultural vehicle such as a vehicle guidance system.

The variable throttle control 20 may be a hand-actuated throttle, a foot-actuated pedal, or any other device that can be manually operated to provide a variable control signal to the control device 18 for selecting a desired engine speed. For example, in one embodiment, the variable throttle control 20 is a hand throttle that outputs a 0-5V signal, with a 0V output corresponding to a minimum engine speed and a 5V output corresponding to a maximum engine speed. The variable throttle control 20 may also output a 5-20 ma signal or any other analog or digital signal capable of representing a selected engine speed.

The mode selector 22 may be a selector switch, a series of pushbuttons, a touchscreen display, or any other input device that can be activated to select one or more pre-set engine speeds. In one embodiment, the mode selector 22 is a four position switch that permits selection between four modes, each corresponding to a pre-set engine speed. For example, a first mode may correspond to an engine speed of 1,000 RPM, a second mode may correspond to an engine speed of 1,300 RPM, a third mode may correspond to an engine speed of 1,600, and a fourth mode may correspond to an engine speed of 2,000 RPM. In another embodiment, the first two modes may correspond to an Engine A speed and an Engine B speed, both selectable by an operator. The third mode may correspond to a Constant Ground Speed Mode that maintains the ground speed of the vehicle 12 regardless of other factors such as the vehicle's gear, the terrain over which the vehicle is traveling, implements the vehicle is pulling, etc. The fourth mode may correspond to a Maximum Power Mode that sets the engine speed to obtain maximum power, which is often required when the vehicle 12 is pulling an implement or carrying a heavy load. The number of modes and their corresponding purposes and engine speeds described herein are only examples and may be changed without departing from the scope of the invention.

Other embodiments of the speed control system 10 may also comprise a speed sensor 26, a speed/gear actuator 28, a display 30, memory 32, a user interface 34, and one or more I/O ports 38. The speed sensor 26 is conventional and detects or monitors the speed of the vehicle 12. Likewise, the speed/gear actuator 28 is conventional and controls a speed and/or the gears of the vehicle 12 in response to control signals from the control device 18 and/or engine controller 24.

The display 30 may be used to display various information corresponding to the vehicle 12 and its speed control system 10, such as the vehicle speed and direction. The display 30 may comprise conventional black and white, monochrome, or color display elements including CRT, TFT, LCD, and/or plasma display devices. Preferably, the display 30 is of sufficient size to enable a user to easily view it while driving the vehicle 12. The display 30 may be integrated with the user interface 34, such as in embodiments where the display 30 is a touch-screen display to enable the user to interact with it by touching or pointing at display areas to provide information to the guidance system 10.

The memory 32, may be integral with the control device 18, stand-alone memory, or a combination of both. The memory may include, for example, removable and non-removable memory elements such as RAM, ROM, flash, magnetic, optical, USB memory devices, and/or other conventional memory elements. The memory 32 may store various data associated with the operation of the speed control system 10, such as the computer program and code segments mentioned above, or other data for instructing the control device 18 and system elements to perform the steps described herein. The various data stored within the memory 32 may also be associated within one or more databases to facilitate retrieval of the information.

The user interface 34 permits a vehicle operator or user to operate and/or program the speed control system 10. The user interface 34 may comprise one or more functionable inputs such as buttons, switches, scroll wheels, a touch screen associated with the display, voice recognition elements such as a microphone, pointing devices such as mice, touchpads, tracking balls, styluses, a camera such as a digital or film still or video camera, combinations thereof, etc. Further, the user interface 34 may comprise wired or wireless data transfer elements such as a removable memory including the memory 32, data transceivers, etc., to enable the vehicle operator and other devices or parties to remotely interface with the speed control system 10. The system 10 may also include a speaker for providing audible instructions and feedback.

The I/O ports 38 permit data and other information to be transferred to and from the control device 18 and the location-determining component 18. The I/O ports 38 may include a TransFlash card slot for receiving removable TransFlash cards and a USB port for coupling with a USB cable connected to another control device such as a personal computer. Navigational software, cartographic maps, and other data and information may be loaded in the guidance system 10 via the I/O ports 38.

The speed control system 10 may be powered by any conventional power source. For example, the power source may comprise conventional power supply elements such as batteries, battery packs, etc. The power source may also comprise power conduits, connectors, and receptacles operable to receive batteries, battery connectors, or power cables.

Figure 3:
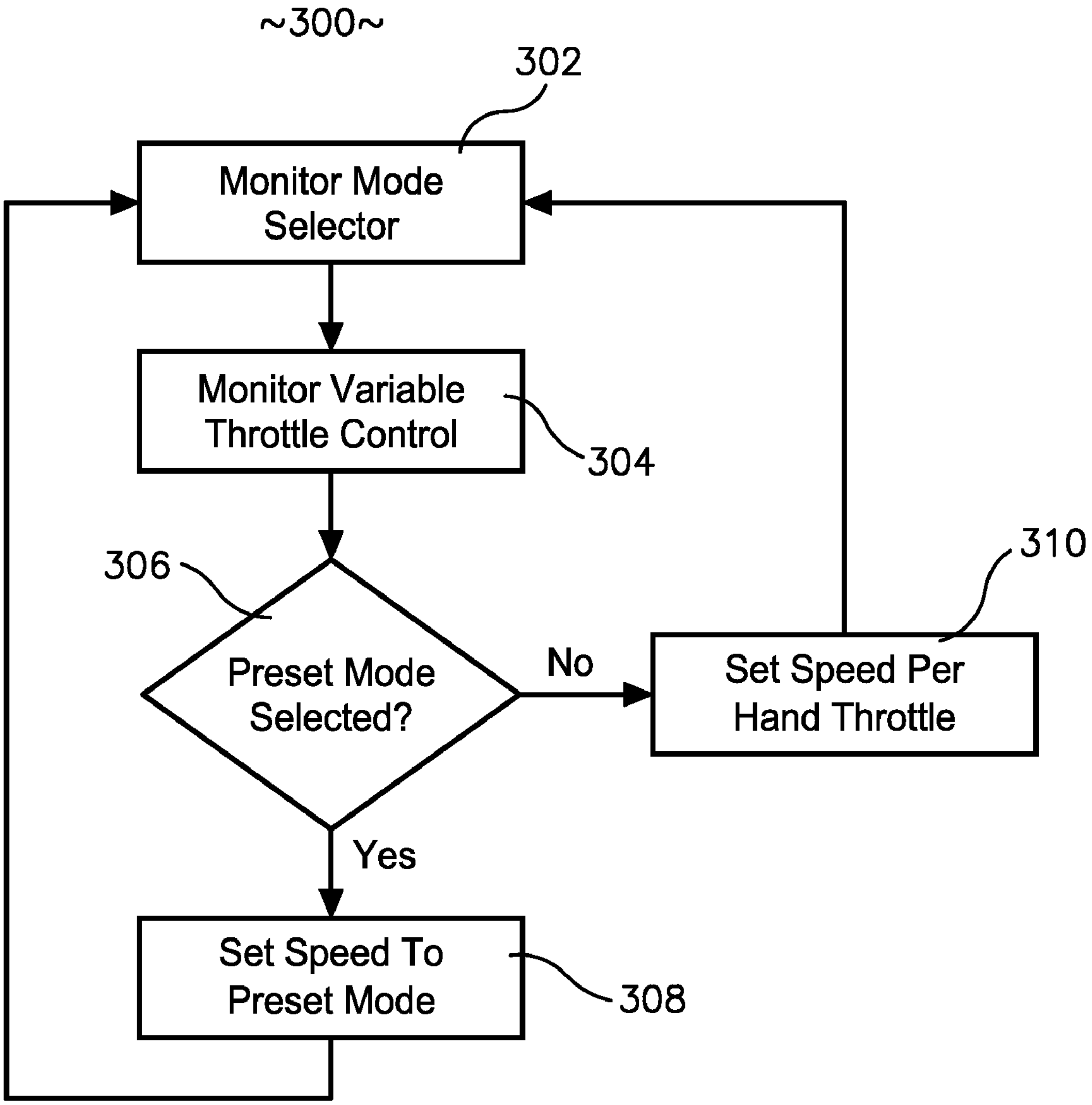
FIG. 3 is a flow chart illustrating selected steps of a method in accordance with embodiments of the invention.

Some of the components illustrated in FIG. 3 and described herein may be housed together in a protective enclosure. However, the components need not be physically connected to one another since wireless communication among the various components is possible and intended to fall within the scope of the present invention.

In operation, the control device 18 receives input signals from the variable throttle control 20 and the mode selector 22 (and possibly other components of the speed control system) and generates speed commands for delivery to the engine controller 24 for controlling the engine speed of the agricultural vehicle 12. As explained in the method descriptions below, the speed commands may take into account the activation and positioning of the variable throttle control 20 and mode selector 22, as well as the direction of movement of the variable throttle control.

In some embodiments, the control device 18 continuously or periodically monitors the variable throttle control 20 to determine if it is static or moving, which direction it is moving and the magnitude of its output signal. The control device 18 determines if the variable throttle control 20 is static or moving by detecting changes in its output signal. Specifically, if the control device 18 detects no changes in the output signal of the variable throttle control, it assumes it is static, and if it detects changes in the output signal, it assumes it is moving. Because the agricultural vehicle may be traveling over rough and uneven terrain that bounces or otherwise moves the variable throttle control, the control device may ignore small changes in the vehicle throttle control output signal. For example, in one embodiment, the control device determines the variable throttle control is moving only if it detects a change in the output signal of 100 mV or more for 500 ms or longer.

Likewise, the control device 18 determines if the variable throttle control is moving up or down by detecting whether the output signal of the variable throttle control is increasing or decreasing. If the output signals increase by 100 mV or more, the control device assumes the variable throttle control is moving up, and if the output signals decrease by 100 mV or more, the control device assumes the variable throttle control is moving down.

Those skilled in the art will appreciate that the control device 18 may detect movement and direction of movement of the variable throttle control 10 in other ways. The particular methods described above are merely examples that may be modified or replaced without departing from the scope of the invention.

Figure 4:
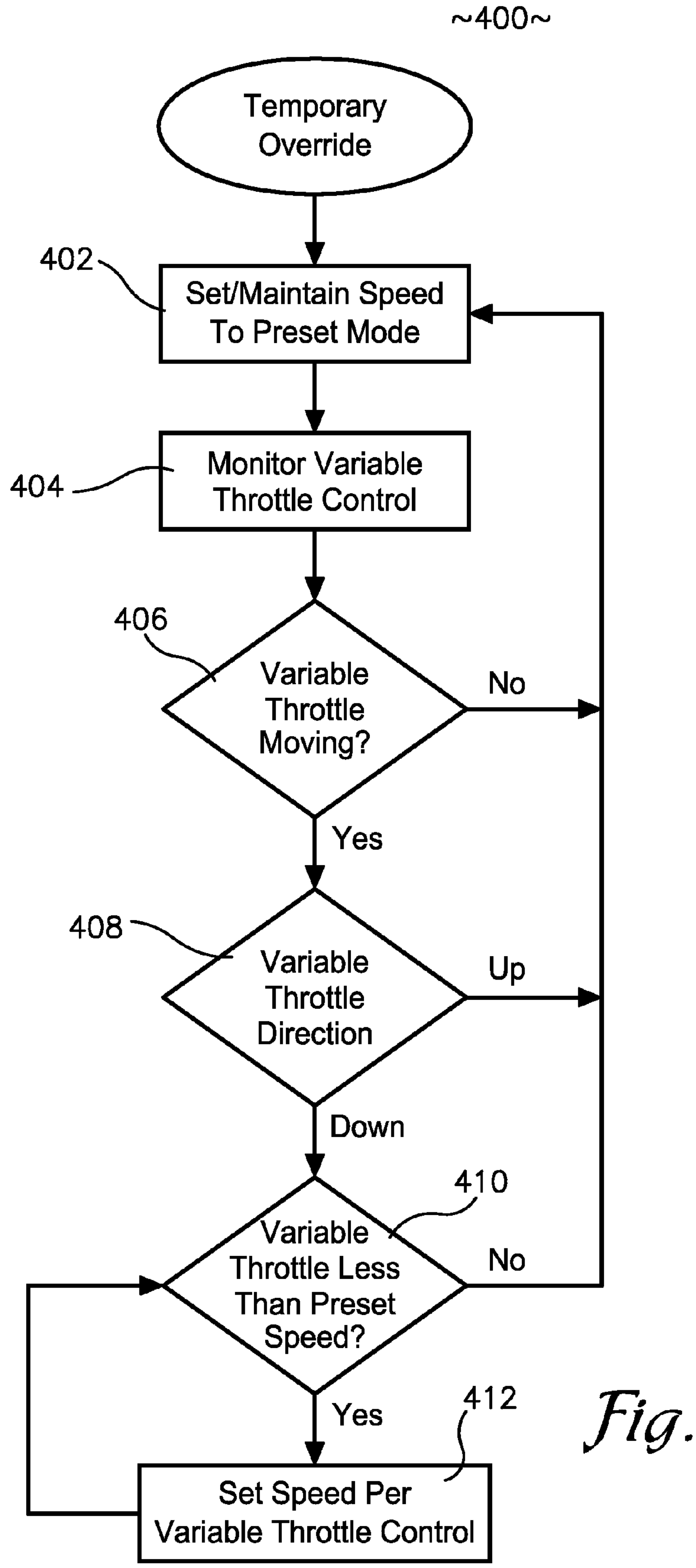
FIG. 4 is another flow chart illustrating selected steps of a method in accordance with embodiments of the invention.
Figure 5:
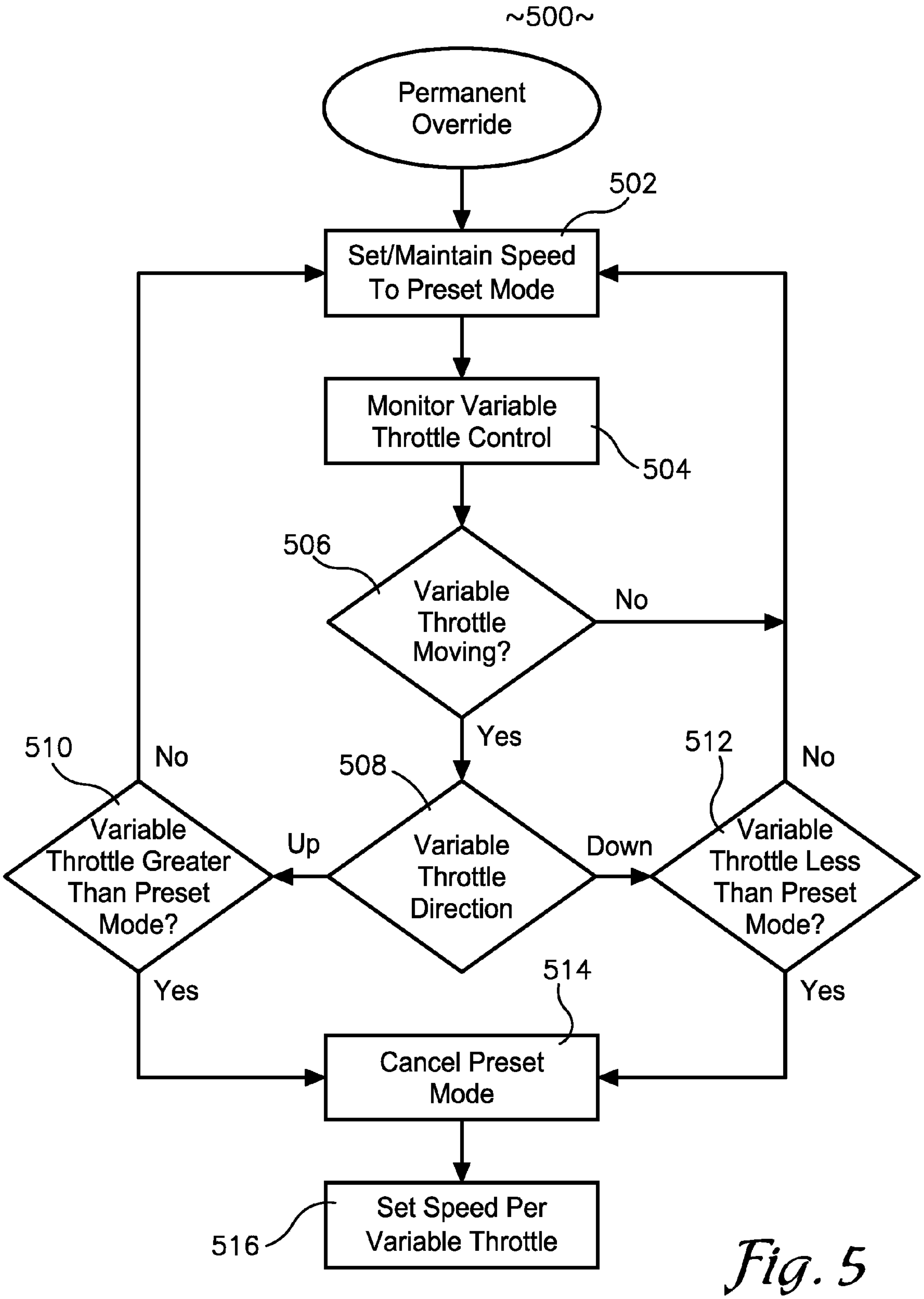
FIG. 5 is another flow chart illustrating selected steps of a method in accordance with embodiments of the invention.

FIGS. 3-5 illustrate steps in exemplary methods 300, 400, 500 of using the speed control system 10 or a similar device. Some or all of the steps may be implemented by the control device 18, by computer programs stored in or accessed by the control device 18, or by other components in communication with the control device 18. The particular order of the steps illustrated in FIGS. 3-5 and described herein can be altered without departing from the scope of the invention. For example, some of the illustrated steps may be reversed, combined, or even removed entirely.

Method 300 shown in FIG. 3 selects an engine speed for the vehicle 12 based at least partially on inputs from the variable throttle control 20 and the mode selector 22. In step 302, the control device 18 or other device polls or otherwise monitors the mode selector 22 to determine if the operator selected one of the pre-set engine speed modes. Similarly, in step 304, the control device 18 polls or otherwise monitors the variable throttle control 20 to read its output signal, determine if it is moving, and determine its direction of movement.

If the control device 18 determines that a pre-set engine speed mode was selected in step 306, the control device 18 sends the engine controller 24 an engine speed command that instructs it to operate the vehicle's engine at the speed corresponding to the selected pre-set mode in step 308. If no pre-set mode was selected, the control device 18 sends the engine controller 24 an engine speed command that instructs it to operate the vehicle's engine at a speed corresponding to the output signal received from the variable throttle control 20 as depicted in step 310. Steps 308 and 310 both return to step 302 so that the control device 18 can continue to monitor the status of the mode selector 22 and variable throttle control 20 and make any necessary changes to its engine speed commands.

Method 400 shown in FIG. 4 temporarily overrides a pre-set engine speed mode in certain situations. This method is particularly useful when the mode selector 22 has been set to either the Constant Ground Speed mode or the Maximum Power mode. The method begins in step 402 where a pre-set engine speed mode is selected and used by the control device to issue a corresponding engine speed command to the engine controller as described above in method 300.

In step 404, the control device monitors the variable throttle control 20 to determine if it is moving, and if so, in which direction. If step 406 determines the variable throttle control 20 is not moving, the method returns to step 402 and the control device 18 continues to maintain the engine speed according to the selected pre-set mode.

If step 406 determines the variable throttle control 20 is moving, the method proceeds to step 408 to determine the direction of movement. If the variable throttle control is moving up (its output signal is increasing), the method returns to step 402 and the control device 18 continues to maintain the engine speed according to the pre-set mode. The control device 18 does not increase the engine speed in this situation even though the variable throttle control 20 apparently calls for an increase because the mode selector 22 was shifted to the Constant Ground Speed mode or Maximum Power mode, and increasing the engine speed while in either of these modes could defeat the purpose of these modes. The operator can of course manually override the pre-set modes at any time by clearing the mode selector 22.

If step 408 determines the variable throttle control 20 is moving down, the method continues to step 410 which determines if the output from the variable throttle control corresponds to a speed less than the speed associated with the selected pre-set mode. If it does not, the method returns to step 402 and the control device continues to maintain the engine speed according to the pre-set selected engine speed mode. This prevents the control device from increasing the engine speed while the operator is moving the variable throttle control down. If the output from the variable throttle control does correspond to a speed less than the pre-set mode, the method proceeds to step 412 where the control device 18 outputs an engine speed command corresponding to the output of the variable throttle control.

Method 500 shown in FIG. 5 permanently overrides or cancels a pre-set engine speed mode in certain situations. This method is particularly useful when the mode selector has been set to any modes other than the Constant Ground Speed mode or the Maximum Power mode. The method begins in step 502 where a pre-set engine speed mode is selected and used by the control device to issue a corresponding engine speed command to the engine controller as described above in method 300.

In step 504, the control device 18 monitors the variable throttle control 20 to determine if it is moving, and if so, in which direction. If step 506 determines the variable throttle control is not moving, the method returns to step 502 and the control device 18 continues to maintain the engine speed according to the selected pre-set mode.

If step 506 determines the variable throttle 20 control is moving, the method proceeds to step 508 to determine the direction of movement. If the variable throttle control is moving up (its output signal is increasing), the method continues to step 510 where the control device 18 determines if the output from the variable throttle control 20 corresponds to a speed that is greater than the speed associated with the pre-set mode. If the answer is yes, the method proceeds to steps 514 and 516 where the control device 18 cancels the pre-set mode and outputs an engine speed command corresponding to the output of the variable throttle control. If the answer is no, the method returns to step 502 and the control device 18 continues to maintain the engine speed according to the pre-set mode. The control device does not cancel the pre-set mode in this situation even though the variable throttle control apparently calls for an increase because switching to the variable throttle control at this point would cause the engine speed to initially drop.

If step 508 determines the variable throttle control 20 is moving down, the method continues to step 512 to determine if the output from the variable throttle control corresponds to a speed less than the speed associated with the selected pre-set mode. If it does not, the method returns to step 502 and the control device continues to maintain the engine speed according to the pre-set selected engine speed mode. This prevents the engine speed from initially increasing even though the operator is moving the variable throttle control down. If the output from the variable throttle control corresponds to a speed less than the pre-set mode, the method proceeds to steps 514 and 516 where the control device cancels the pre-set mode and outputs an engine speed command corresponding to the output of the variable throttle control.

From the foregoing description, it can be seen that the above-described speed control system 10 and methods 300, 400, 500 offer advantages over prior art speed control systems. For example, the system 10 and methods 300, 400, 500 more precisely control the speed of an agricultural vehicle's engine and eliminate abrupt and unwanted engine speed changes associated with prior art engine speed systems.

Although the invention has been described with reference to the embodiments illustrated in the attached drawings, it is noted that equivalents may be employed and substitutions made herein without departing from the scope of the invention as recited in the claims. For example, the methods disclosed herein and illustrated in FIGS. 3-5 may be performed in any order and steps may be added or deleted without departing from the scope of the invention as recited in the claims.

Having thus described an embodiment of the invention, what is claimed as new and desired to be protected by Letters Patent includes the following:

1. An engine speed control system for an agricultural vehicle, the system comprising:

a throttle controller for selecting a variably adjustable engine speed;

a mode selector for selecting between a plurality of pre-set engine speeds; and a control device responsive to the throttle controller and the mode selector for generating engine speed commands and delivering the engine speed commands to an engine controller for controlling the speed of the agricultural vehicle's engine, the control device being operable to generate a first engine speed command associated with one of the pre-set engine speeds when an operator activates the mode selector and to override the first engine speed command with a second engine speed command associated with the throttle controller when the operator activates the throttle controller, the throttle controller is being moved to a lower engine speed, and the throttle controller calls for an engine speed less than the pre-set engine speed, wherein the control device does not override the first engine speed command when the operator actuates the throttle controller and the throttle controller calls for an engine speed greater than the pre-set engine speed.

2. An engine speed control system for an agricultural vehicle, the system comprising:

a throttle controller for selecting a variably adjustable engine speed;

a mode selector for selecting between a plurality of pre-set engine speeds; and a control device responsive to the throttle controller and the mode selector for generating engine speed commands and delivering the engine speed commands to an engine controller for controlling the speed of the agricultural vehicle's engine, the control device being operable to generate a first engine speed command associated with one of the pre-set engine speeds when an operator activates the mode selector and to override the first engine speed command with a second engine speed command associated with the throttle controller when the operator activates the throttle controller, the throttle controller is being moved to a lower engine speed, and the throttle controller calls for an engine speed less than the pre-set engine speed, wherein the control device maintains the first engine speed command when the operator activates the throttle controller and the throttle controller calls for an engine speed greater than the pre-set engine speed.

3. The system as set forth in claim 1, wherein the throttle controller is a hand throttle configured to be positioned within a cab of the agricultural vehicle.

4. The system as set forth in claim 1, wherein the mode selector is a mode selector switch that permits selection of first or second pre-set engine speeds.

5. The system as set forth in claim 1, wherein the mode selector is a mode selector switch that permits selection of first, second, third, or fourth pre-set engine speeds.

6. The system as set forth in claim 1, wherein the control device is incorporated within a vehicle guidance system of the agricultural vehicle.

* * * * *